United States Patent
Su et al.

(10) Patent No.: US 11,340,393 B2
(45) Date of Patent: May 24, 2022

(54) BACKLIGHT MODULE INCLUDING SIDE SURFACE HAVING ACUTE ANGLE MANUFACTURING METHOD THEREOF AND DISPLAY DEVICE AND ILLUMINATING DEVICE COMPRISING THE SAME

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Xuezhen Su, Beijing (CN); Jianming Huang, Beijing (CN); Dongxi Li, Beijing (CN); Li Cheng, Beijing (CN); Weiqiang Li, Beijing (CN); Yabin Lin, Beijing (CN); Wanping Pan, Beijing (CN); Jinshu Wu, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 605 days.

(21) Appl. No.: 16/333,169

(22) PCT Filed: Sep. 25, 2018

(86) PCT No.: PCT/CN2018/107360
§ 371 (c)(1),
(2) Date: Mar. 13, 2019

(87) PCT Pub. No.: WO2019/057207
PCT Pub. Date: Mar. 28, 2019

(65) Prior Publication Data
US 2021/0364856 A1    Nov. 25, 2021

(30) Foreign Application Priority Data

Sep. 25, 2017  (CN) .......................... 201710877792.4

(51) Int. Cl.
*F21V 8/00* (2006.01)
*G02F 1/13357* (2006.01)

(52) U.S. Cl.
CPC ........... *G02B 6/002* (2013.01); *G02B 6/0045* (2013.01); *G02B 6/0046* (2013.01);
(Continued)

(58) Field of Classification Search
CPC .... G02B 6/002; G02B 6/0045; G02B 6/0046; G02B 6/0066; G02B 6/0068; G02F 1/133314; G02F 1/133605
See application file for complete search history.

(56) References Cited

U.S. PATENT DOCUMENTS

| | | | |
|---|---|---|---|
| 2009/0262283 A1* | 10/2009 | Olson | G02B 6/002 349/65 |
| 2015/0146113 A1* | 5/2015 | Kasai | G02B 6/002 348/794 |

(Continued)

FOREIGN PATENT DOCUMENTS

| | | |
|---|---|---|
| CN | 202598303 U | 12/2012 |
| CN | 202868487 U | 4/2013 |

(Continued)

OTHER PUBLICATIONS

First Chinese Office Action for Chinese Patent Application No. 201710877792.4, dated Mar. 6, 2019, 20 pages.

(Continued)

*Primary Examiner* — Keith G. Delahoussaye
(74) *Attorney, Agent, or Firm* — Kinney & Lange, P.A.

(57) ABSTRACT

A backlight module, a method of manufacturing the backlight module, a display device and an illuminating device are
(Continued)

disclosed. The backlight module includes: a light guide plate having a first surface and a second surface opposed to each other and at least one side surface between the first surface and the second surface, the side surface being provided with a first light reflecting structure and having an acute angle with respect to the first surface; a light source disposed at a side of the first surface, an orthographic projection of the light source onto the first surface being at an edge portion of the first surface adjacent to the side surface, wherein the light emitted by the light source is at least partially reflected by the first light reflecting structure after entering the light guide plate through the first surface of the light guide plate.

13 Claims, 5 Drawing Sheets

(52) U.S. Cl.
CPC ......... *G02B 6/0055* (2013.01); *G02B 6/0066* (2013.01); *G02B 6/0068* (2013.01); *G02F 1/133605* (2013.01); *G02F 1/133615* (2013.01)

(56) References Cited

U.S. PATENT DOCUMENTS

| | | |
|---|---|---|
| 2016/0356939 A1 | 12/2016 | Wang |
| 2017/0153498 A1* | 6/2017 | Qiu ............................ F21V 7/06 |
| 2017/0184854 A1* | 6/2017 | Takagi ................... G02B 6/002 |

FOREIGN PATENT DOCUMENTS

| | | | | |
|---|---|---|---|---|
| CN | 104359051 | A | | 2/2015 |
| CN | 104421770 | A | | 3/2015 |
| CN | 104776363 | A | | 7/2015 |
| CN | 106842411 | A | * | 6/2017 |
| CN | 206348475 | U | | 7/2017 |
| JP | 2012123995 | A | | 6/2012 |

OTHER PUBLICATIONS

Second Chinese Office Action for Chinese Patent Application No. 201710877792.4, dated Jul. 23, 2019, 21 pages.
International Search Report and Written Opinion for International Patent Application No. PCT/CN2018/107360, dated Dec. 10, 2018, 6 pages.

* cited by examiner

BACKLIGHT MODULE INCLUDING SIDE SURFACE HAVING ACUTE ANGLE MANUFACTURING METHOD THEREOF AND DISPLAY DEVICE AND ILLUMINATING DEVICE COMPRISING THE SAME

CROSS-REFERENCE TO RELATED APPLICATION

The present application is a Section 371 National Stage Application of International Application No. PCT/CN2018/107360, filed on Sep. 25, 2018, entitled "BACKLIGHT MODULE, MANUFACTURING METHOD THEREOF, AND DISPLAY DEVICE AND ILLUMINATING DEVICE COMPRISING THE SAME", which claims the benefit of Chinese Patent Application No. 201710877792.4 filed on Sep. 25, 2017 with the China National Intellectual Property Administration, the whole disclosure of which is incorporated herein by reference.

TECHNICAL FIELD

The present disclosure relates to the field of display technologies, and more particularly to a backlight module, a manufacturing method thereof, as well as a display device and an illuminating device including the same.

BACKGROUND

In display devices such as liquid crystal displays (LCDs), the liquid crystal layer itself does not emit light but only functions as a switch such as shutters. Therefore, a backlight module is required to provide illumination so as to create a visible image. As the apparatus employing liquid crystal displays get lighter and thinner and the frames of the liquid crystal displays get narrower, the existing backlight modules have not been able to meet this demand well.

SUMMARY

In order to at least partially alleviate the problem of satisfying the above needs, a backlight module, a method of manufacturing the same, a display device and an illuminating device including the same are provided.

An embodiment of the present disclosure provides a backlight module. The backlight module includes: a light guide plate having a first surface and a second surface opposed to each other and at least one side surface between the first surface and second surface, the side surface being provided with a first light reflecting structure and having an acute angle with respect to the first surface; a light source disposed at a side of the light guide plate with the first surface, an orthographic projection of the light source on the first surface being at an edge portion of the first surface of the light guide plate that is adjacent to the side surface, wherein the light emitted by the light source is at least partially reflected by the first light reflecting structure after entering the light guide plate through the first surface of the light guide plate. In some embodiments, the first light reflecting structure is a light reflecting film formed on the side surface. In some embodiments, a portion of the second surface of the light guide plate that adjoins the at least one side surface is provided with a second light reflecting structure, wherein the light emitted by the light source is at least partially reflected by the second light reflecting structure after entering the light guide plate through the first surface of the light guide plate. In some embodiments, the first light reflecting structure is made from the same material as the second light reflecting structure. In some embodiments, orthographic projections of both the first light reflecting structure and the second light reflecting structure on the first surface of the light guide plate collectively cover an orthographic projection of the light source on the first surface of the light guide plate. In some embodiments, the light source is a strip-shaped light source extending along a lengthwise direction of the side surface. In some embodiments, the backlight module further includes: a back plate configured to support the light guide plate and provided with a groove at an edge of the back plate that is close to the side surface, wherein the light source is fixed in the groove. In some embodiments, the back plate has a side wall in contact with the side surface and an extension portion projecting from the side wall towards a side of the back plate facing the light guide plate, at the edge close to the side surface of the light guide plate, such that the side surface and the side wall and the extension portion of the back plate collectively enclose the light source. In some embodiments, a portion of the first light reflecting structure separates the side wall of the back plate from the at least one side surface.

An embodiment of the present disclosure also provides a method of manufacturing a backlight module, including: fixing a light source on a back plate; forming a first light reflecting structure on at least one side surface of a light guide plate, the at least one side surface of the light guide plate being located between a first surface and a second surface of the light guide plate opposed to each other and having an acute angle with respect to a first surface of the light guide plate; and fixing the light guide plate on the back plate, such that the light source is located at a side of the light guide plate with the first surface and an orthographic projection of the light source on the first surface is at an edge portion of the first surface of the light guide plate that is adjacent to the side surface, and the light emitted from the light source is at least partially reflected by the first light reflecting structure after entering the light guide plate through the first surface of the light guide plate.

In some embodiments, the step of forming the first light reflecting structure on at least one side surface of the light guide plate comprises: forming a light reflecting film on at least one side surface of the light guide plate. In some embodiments, the method further includes: forming a second light reflecting structure on a portion of an second surface of the light guide plate that adjoins the at least one side surface, wherein the light emitted by the light source is at least partially reflected by the second light reflecting structure after entering the light guide plate through the first surface of the light guide plate. In some embodiments, the first light reflecting structure and the second light reflecting structure are formed integrally.

An embodiment of the present disclosure also provides a display device including the foregoing backlight module.

An embodiment of the present disclosure also provides an illuminating device including the foregoing backlight module.

BRIEF DESCRIPTION OF THE DRAWINGS

The above and other objects, features and advantages of the present disclosure will become more apparent by describing the preferred embodiments of the present disclosure with reference to the accompanying drawings, wherein.

DETAILED DESCRIPTION OF EMBODIMENTS

Figure 1:
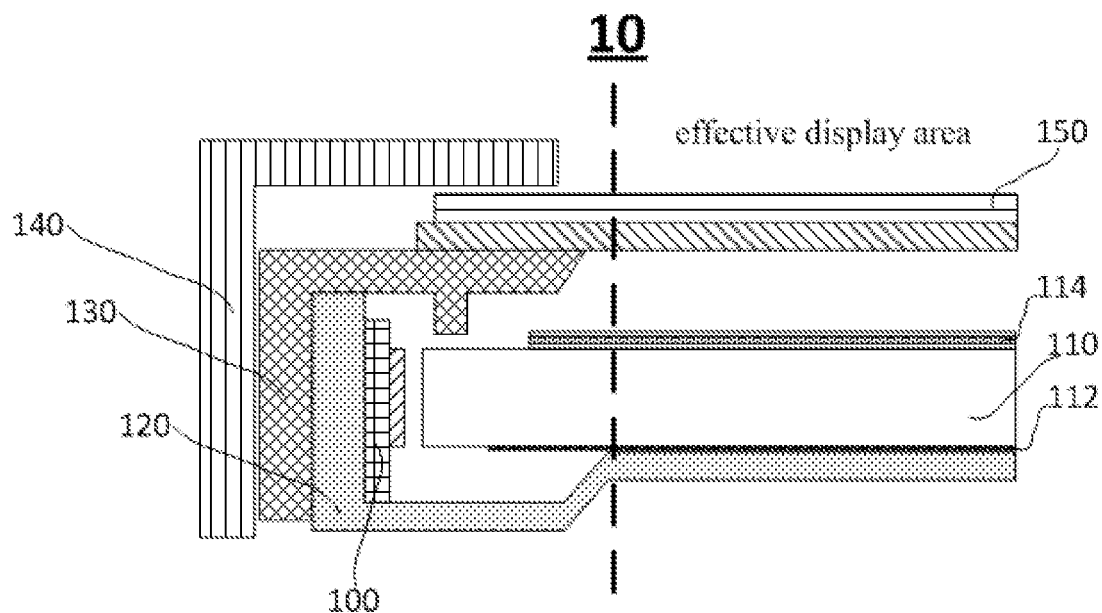
FIG. 1 is a partial cross-sectional view of a display device in accordance with an embodiment of the present disclosure.

The detailed description of the embodiments of the present invention will be described in detail below with reference to the drawings. The details and functions that are not necessary for the present disclosure are omitted in the description in order to make the present disclosure more clear. In the present description, the following various embodiments for describing the principles of the present disclosure are merely presented for illustrative purposes only and should not be explained as limiting the scope of the present disclosure in any way. The following description with reference to the drawings is for better understanding of the illustrative embodiments of the present disclosure defined in claims and their equivalents. The description below includes numerous specific details to assist in the understanding, but these details should be considered as merely exemplary examples. Accordingly, it will be appreciated by those skilled in the art that various changes and modifications may be made to the embodiments described herein without departing from the scope and spirit of the present disclosure. In addition, descriptions of well-known functions and constructions are omitted for clarity and conciseness. In addition, the same reference numbers are used throughout the drawings for the same or similar functions, devices and/or operations. In addition, in the drawings, the parts are not necessarily drawn to scale. In other words, the relative sizes, lengths, and the like of the respective portions in the drawings do not necessarily correspond to actual scales.

In the present disclosure, the wording "include" and "comprising" and their derivatives are intended to be inclusive and not limiting; the wording "or" is inclusive, meaning "and/or". In addition, in the following description of the present disclosure, the orientation terms, such as "upper", "lower", "left", "right", etc., are used to indicate relative positions to assist those skilled in the art in understanding embodiments of the present disclosure. Thus, those skilled in the art should understand that "upper"/"lower" in one direction may turn into "lower"/"upper" in the opposite direction, and may turn into other relative positions, such as "left"/"right", etc., in the other direction.

Hereinafter, an LCD display device is taken as an example for detailed description of the present disclosure. However, those skilled in the art should understand that the field of application of the present disclosure is not limited thereto. In fact, the backlight module and manufacturing method thereof according to embodiments of the present disclosure may be applied to other field including backlight modules or light sources.

Hereinafter, the configuration of a display device according to an embodiment of the present disclosure will be described in detail with reference to FIG. 1.

FIG. 1 is a partial cross-sectional view of an exemplary display device 10 in accordance with an embodiment of the present disclosure. As shown in FIG. 1, the display device 10 may be, for example, an LCD display device, which may include, for example, a light source 100, a light guide plate 110, a back plate 120, and the like. In addition, the display device 10 may further include, for example, a plastic frame 130, a front frame 140, a panel 150, and the like. However, it should be noted that the display device 10 is for illustrative purposes only, which means that the display device according to other embodiments of the present disclosure may not necessarily include one or more of these components. In other words, one or more of these components may be optional.

As shown in FIG. 1, the light source 100 may be, for example (but not limited to): a light emitting diode (LED), an electroluminescent panel (ELP), a cold cathode fluorescent lamp (CCFL), a hot cathode fluorescent lamp (HCFL), an external electrode fluorescent lamp (EEFL), and the like. Hereinafter, for convenience of description, an LED light source will be taken as an example for detailed explanation. However, those skilled in the art will appreciate that the LED light source can be replaced with other light sources without departing from the scope of the present disclosure. As will be described in detail below, the light source 100 may have configuration illustrated for example in FIG. 4A and/or FIG. 4B.

As shown in FIG. 1, light emitted from the light source 100 may enter the light guide plate 110 via its side surface. The first surface (i.e., a lower surface shown in FIG. 1) of the light guide plate 110 may be provided with (for example, attached) a reflecting plate 112 for reflecting back the light reaching the first surface of the light guide plate 110, thereby, increasing the amount of light emitted from the second surface (i.e., an upper surface shown in FIG. 1) of the light guide plate 110 and reducing the energy loss. Further, one or more optical plates 114 are provided (for example, attached) on the second surface of the light guide plate 110. The optical plates 114 may be used to filter the light emitted from the second surface of the light guide plate 110. For example, these optical plates 114 may be arranged such that the emitted light has a specified frequency, or such that the emitted light is more uniform in brightness and the like. However, the embodiment according to the present disclosure would be realized whether the optical plates 114 exist or not, so a detailed description thereof is omitted herein.

After being filtered by the optical plate 114 (or directly emitted without being filtered), the light emitted from the light guide plate 110 will arrive at the panel 150 as shown in FIG. 1. The panel 150 may also include a multi-layer structure. In the case of an LCD display for example, the multi-layer structure may for example include (but not limited to) one or more of the following components: a polarizer, a lower electrode, a liquid crystal layer, a second electrode, another polarizer, a color film, or the like. However, the present disclosure is not limited thereto, and actually any display device including a backlight module may be applicable. For example, in some cases, the panel 150 may be even absent, and the light emitted from the backlight module (e.g., including the light source 100 and the light guide plate 110) may be directly provided outwards, for example, to be used in a flash lamp, an illumination lamp, or the like.

In the embodiment as shown in FIG. 1, by placing the light source 100 on the side surface of the light guide plate 110 to form an edge-lit type backlight module, the display device 10 may be configured to be thinner so as to be in line with the trend of the foregoing device.

Figure 4A:
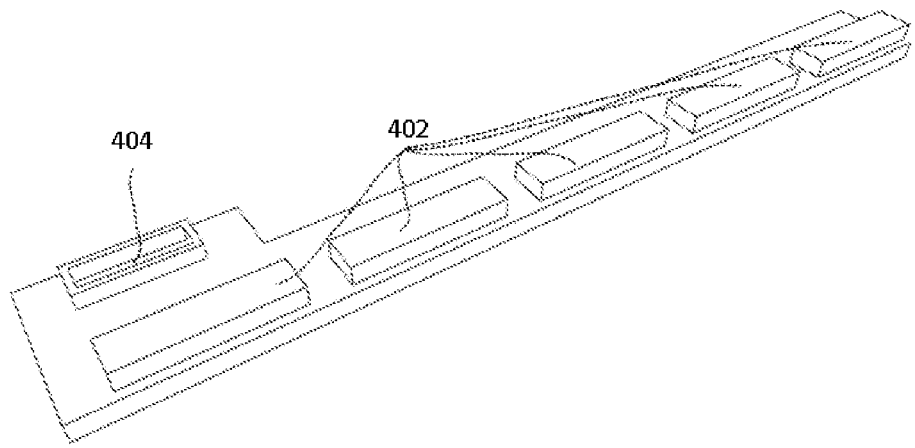
FIG. 4A is a perspective view schematically showing a light source according to an embodiment of the present disclosure.

However, it should be noted that with the development of liquid crystal displays, narrow frame and frameless products are becoming more and more popular. The effective display area (AA) of the narrow frame and the frameless product is closer to the inner side of the back plate, thus, if the light source (for example, LED) deviates from it right location or the distance between the light source and the effective display area AA is too short, hot spot or smear defects are likely to occur. For example, in the case that the light source 100 itself is an LED light bar as shown in FIG. 4A, the light emitted by adjacent LED units (for example, the light emitting units 402) would form bright and dark stripes at the edge of the display device, resulting in poor user experience. In addition, as shown in FIG. 1, if a large manufacturing tolerance occurs when the plastic frame 130 is assembled (for example, bonded) with the back plate 120, a relatively large gap would be formed between the plastic frame 130 and the light guide plate 110. Thus, a part of the light emitted from the light source 100 may be directly emitted from the gap rather than enter the light guide plate 110, resulting in a light leakage at the edge of the display 10.

In order to at least partially solve or alleviate the problem, a backlight module according to another embodiment of the present disclosure is provided. Hereinafter, a backlight module according to another embodiment of the present disclosure will be described in detail with reference to FIG. 2.

Figure 2:
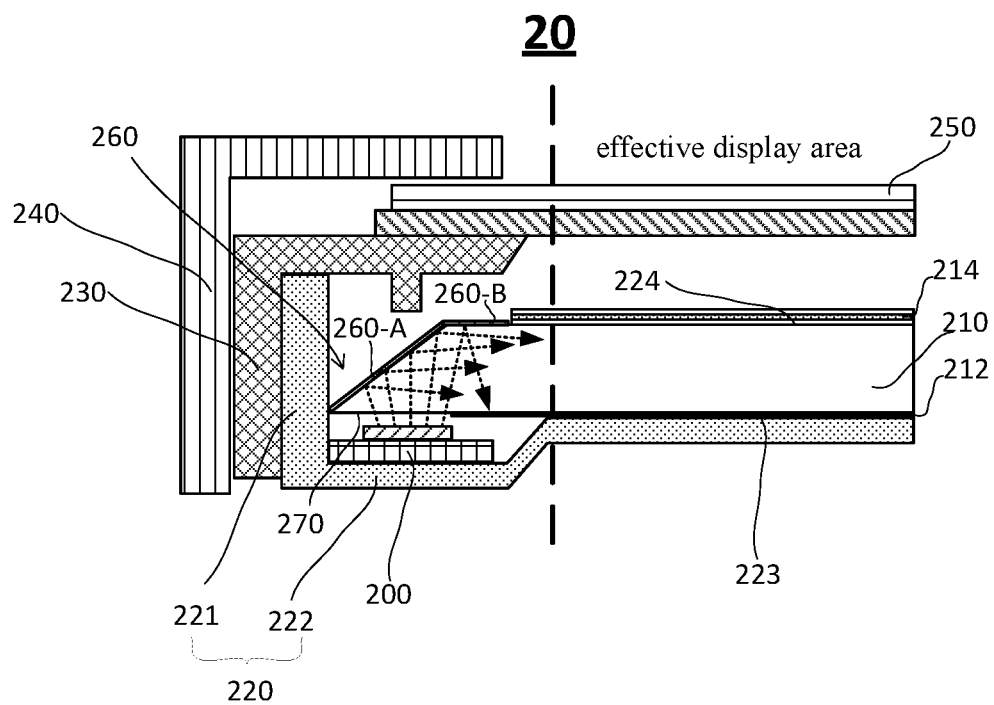
FIG. 2 is a partial cross-sectional view of a display device in accordance with another embodiment of the present disclosure.

FIG. 2 is a partial cross-sectional view schematically showing a display device 20 according to another embodiment of the present disclosure. For the sake of convenience of description, the detailed description of the same or similar components as those in FIG. 1 will be omitted in FIG. 2 to avoid unnecessary details so that the embodiment is described clearer.

As shown in FIG. 2, the display device 20 also includes a light source 200 and a light guide plate 210. The light guide plate 210 has a first surface (i.e., a lower surface shown in FIG. 2) and a second surface (i.e., an upper surface shown in FIG. 2) opposed to each other and at least one side surface between the first surface and second surface. However, unlike the embodiment shown in FIG. 1, the light source 200 may be disposed below the light guide plate 210 rather than at the side surface. For example, in some embodiments, the light source 200 may be disposed at a side of the light guide plate 210 with the first surface 223 and an orthographic projection of the light source onto the first surface 223 of the light guide plate 210 being at an edge portion 270 of the first surface 223 of the light guide plate 210 that is adjacent to the side surface 260 of the light guide plate 210. In the example shown in FIG. 2, the light source 200 is located below the edge portion 270. One of the differences between the conventional direct-lit type backlight module and the present embodiment lies in that in the present embodiment the light source 200 is disposed only at the edge of the light guide plate 210 while in the general direct-lit type backlight module a plurality of light sources are dispersedly disposed on a back surface of the entire light guide plate rather than at the edge only. That is, in some embodiments, the light source 200 may be only disposed below the edge portion 270 of the first surface 223 of the light guide plate 210 that is adjacent to at least one side surface 260 of the light guide plate 210, without being dispersedly disposed below the first surface 223 of the entire light guide plate.

Figure 3:
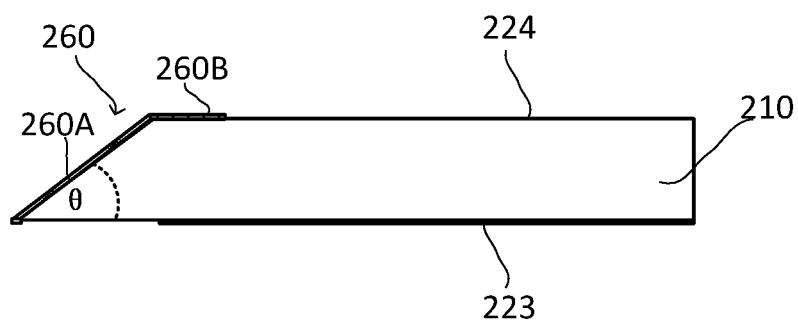
FIG. 3 is an enlarged partial cross-sectional view schematically showing a light guide plate employed in the display device as shown in FIG. 2.

Further, unlike the embodiment shown in FIG. 1, the light guide plate 210 may have a different edge configuration from the light guide plate 110 shown in FIG. 1. For example, in some embodiments, at least one side surface 260 of the light guide plate 210 may have an acute angle (e.g., θ as shown in FIG. 3) with respect to its first surface 223, and the at least one side surface 260 may be provided with a first light reflecting structure 260A. Therefore, by means of the cooperation of the relative position and/or configuration of the light source 200 and the light guide plate 210 as shown in FIG. 2, the light emitted by the light source 200 may enter the light guide plate 210 through its the first surface 223 and then be at least partially reflected by the first light reflecting structure 260A. Thereby, it is possible to form a technical effect similar to the edge-lit type backlight module. Additionally, it is possible to avoid various brightness abnormalities, shading patterns, and the like due to the manufacturing tolerance or the backlight module being too close to the effective display area.

In some embodiments, the first light reflecting structure 260A may be a light reflecting film formed on at least one side surface 260 of the light guide plate 210, such as the portion indicated by reference numeral 260A in FIG. 2. In addition, in other embodiments, the portion of the second surface 224 of the light guide plate 210 that is in contact with the at least one side surface 260 may also be provided with a second light reflecting structure 260B, such as the portion indicated by reference numeral 260B in FIG. 2. By further forming the second light reflecting structure 260B in addition to the first light reflecting structure 260A, the light emitted by the light source 200 may be at least partially reflected by the second light reflecting structure 260B after entering the light guide plate 210 through the first surface 223 of the light guide plate 210. Thus the light leakage may be further avoided and the light loss is reduced. Likewise, the second light reflecting structure 260B may also be a light reflecting film. Further, the first light reflecting structure 260A and the second light reflecting structure 260B may be of an integrally formed light reflecting film.

As shown, the orthographic projection of both the first light reflecting structure 260A and the second light reflecting structure 260B on the first surface 223 of the light guide plate 210 covers the orthographic projection of the light source 200 on the first surface 223 of the light guide plate 210, so that the light emitted from the light source 200 is substantially reflected into the light guide plate 210, thereby preventing the light emitted from the light source 200 from leaking from a position other than the light guide plate 210.

In order to explain the detailed structure of the light guide plate 210 in more detail, please refer to FIG. 3. FIG. 3 is an enlarged partial cross-sectional view schematically showing a light guide plate 210 employed in the display device 20 as shown in FIG. 2.

As shown in FIG. 3 and referring to FIG. 2, the side surface 260 of the light guide plate 210 on which the first light reflecting structure 260A is disposed may be in contact with a side wall 221 of the back plate 220. In other words, the back plate 220 has a side wall in contact with the side surface 260 and an extension portion 222 which projects from the side wall 221 toward one side of the light guide plate 210 facing the back plate 220, at the edge of the light guide plate 210 close to this side surface, such that this side surface 260 of the light guide plate 210 and the side wall 221 and the extension portion 222 of the back plate 220 enclose the light source 200 together so as to prevent the light emitted from the light source 200 from leaking from a position other than the light guide plate 210. Further, the first light reflecting structure 260A may form a corner wrapping an apex (or the top edge in the actual three-dimensional case) of the angle θ shown in FIG. 3. Or more generally, a portion of the first light reflecting structure 260A may separate the side wall 221 of the back plate 220 from at least one side surface of the light guide plate 210, thereby preventing the side surface of the light guide plate 210 from being damaged when the backlight module is mounted and used and thus avoiding white spots.

In addition, in some embodiments, the parameters actually used, such as the angle θ between the inclined surface and the first surface of the light guide plate and/or the attachment length of the reflecting film, may be determined (e.g., simulated, etc.) by optical simulation (e.g., software tool such as MATLAB).

Figure 4B:
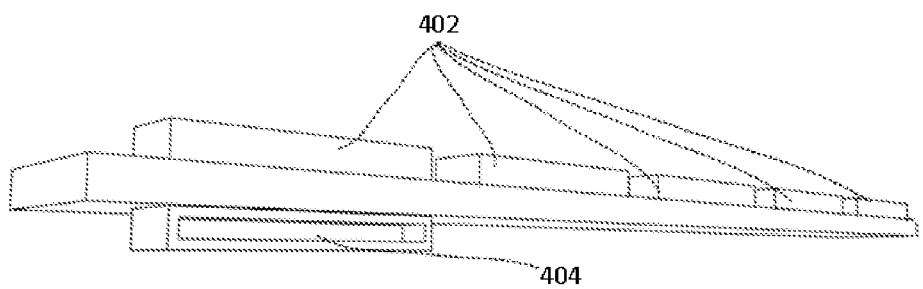
FIG. 4B is a perspective view schematically showing a light source according to another embodiment of the present disclosure.

In the embodiment shown in FIG. 2, the light source 100 may be a strip-shaped light source extending along the length direction of at least one side surface of the light guide plate 210, for example as shown in FIG. 4A or FIG. 4B. FIG. 4A is a perspective view schematically showing a light source according to an embodiment of the present disclosure. FIG. 4B is a perspective view schematically showing a light source according to another embodiment of the present disclosure.

As shown in FIG. 4A and/or FIG. 4B, the light source may include one or more lighting units 402 and a power supply slot 404. The difference between FIG. 4A and FIG. 4B primarily lies in the position and orientation of the power supply slot 404. The light source shown in FIG. 4A may be applied to, for example, the embodiment shown in FIG. 1. The edge-lit type light source may be assembled through being simply inserted at, for example, the side edge of the display device 10 and connected to the corresponding power supply plug. However, for the embodiment shown in FIG. 2 and FIG. 3, since the position of the light source 200 is under the light guide plate 210, it is required to adjust the position and orientation of the power supply slot 404. For example, the configuration shown in FIG. 4B may be used, as a result, the installation and electrical connection of the light source may be still realized by simply inserting it at, for example, the side edge of the display device 20 and connecting it to a corresponding power supply plug. In other words, in some embodiments, the light source 200 may have a power socket (or more specifically, a power supply slot) that is disposed on the surface of the light source 200 that faces away from the light guide plate 210. In addition, the opening direction of the power socket is substantially perpendicular to the light emitting direction of the light source 200 and faces toward the backlight module.

In addition, in order to make the light source 200 disposed under the light guide plate 210 as shown in FIG. 2, the back plate 220 may be configured to support the light guide plate 210. The back plate 220 may be further provided with a groove (for example, a strip-shaped groove) at its edge that is close to the at least one side surface 260 and the light source 200 may be fixed in the groove. The groove may be a groove formed in a metal plate during the production process of the back sheet 220. In the embodiment shown in FIG. 2, the side surface of the light source 200 may be attached to the side wall 221 of the back plate 220 during assembly so as to reduce the difficulty of installation.

Figure 5:
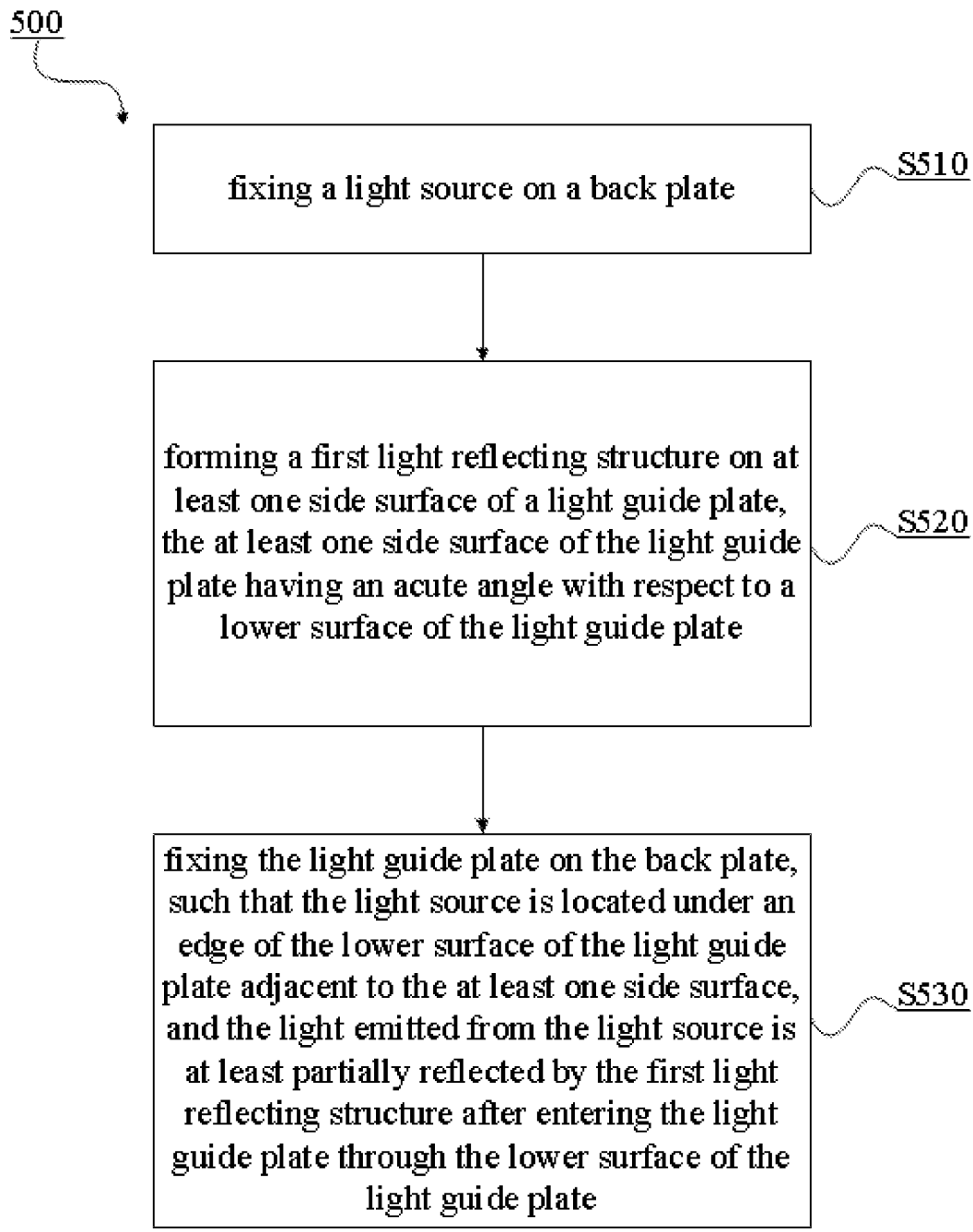
FIG. 5 is a flow chart showing an exemplary method for fabricating a backlight module in accordance with an embodiment of the present disclosure.

Next, a method of manufacturing the backlight module according to embodiments of the present disclosure will be described in detail with reference to FIG. 5. FIG. 5 is a flow chart showing an exemplary method 500 for fabricating a backlight module in accordance with an embodiment of the present disclosure. As shown in FIG. 5, the method 500 may include steps S510, S520, and S530. According to some embodiments of the present disclosure, some steps of the method 500 may be performed separately or in combination, may be performed in parallel or sequentially, and are not limited to the specific operational sequence shown in FIG. 5.

The method 500 begins with step S510, in which the light source 200 is fixed on the back plate 220.

In step S520, a first light reflecting structure 260A is formed on at least one side surface of the light guide plate 210, and the angle between the at least one side surface and the first surface of the light guide plate 210 is an acute angle.

In step S530, the light guide plate 210 is fixed on the back plate 220, such that the light source 200 is located at a side of the light guide plate 210 with the first surface 223 and an orthographic projection of the light source onto the first surface 223 of the light guide plate 210 is at the edge portion 270 of the first surface 223 of the light guide plate 210 that is adjacent to the side surface, and the light emitted from the light source 200 may be at least partially reflected by the first light reflecting structure 260A after entering the light guide plate 210 through its first surface 223.

In some embodiments, the first light reflecting structure 260A is formed by forming a light reflecting film on the side surface 260. In some embodiments, the method 500 may further include: forming a second light reflecting structure 260B on the portion of the second surface 224 of the light guide plate 210 that adjoins the side surface 260 of the light guide plate 210. After entering the light guide plate 210 through its first surface 223, the light emitted from the light source 200 is at least partially reflected by the second light reflecting structure 260B. Thus, by adding the second light reflecting structure 260B, the amount of guided light may be further increased so as to avoid brightness abnormality at the edge.

In some embodiments, in the method 500, the first light reflecting structure 260A and the second light reflecting structure 260B are integrally formed on the side surface of the light guide plate 210 and the portion of the second surface 224 of the light guide plate 210 that adjoins the side surface 260 of the light guide plate 210. The first light reflecting structure 260A is made from the same material as the second light reflecting structure 260B. By integrally forming the first light reflecting structure 260A and the second light reflecting structure 260B, the production process may be reduced effectively and the light leakage may be avoided.

By adopting the backlight module according to some embodiments of the present disclosure, the brightness abnormality that may be generated by the edge-lit type backlight module may be avoided. Additionally, the product of the direct-lit type backlight module may be prevented from being excessively thick, since the light sources are disposed only at the edge. In addition, the backlight module may be used in a narrow frame or a frameless product, so that hot spots or smear defects that are often found in such products may be avoided. In addition, in addition to a narrow frame or a frameless product, the backlight module may be applied to a general display device.

Figure 6:
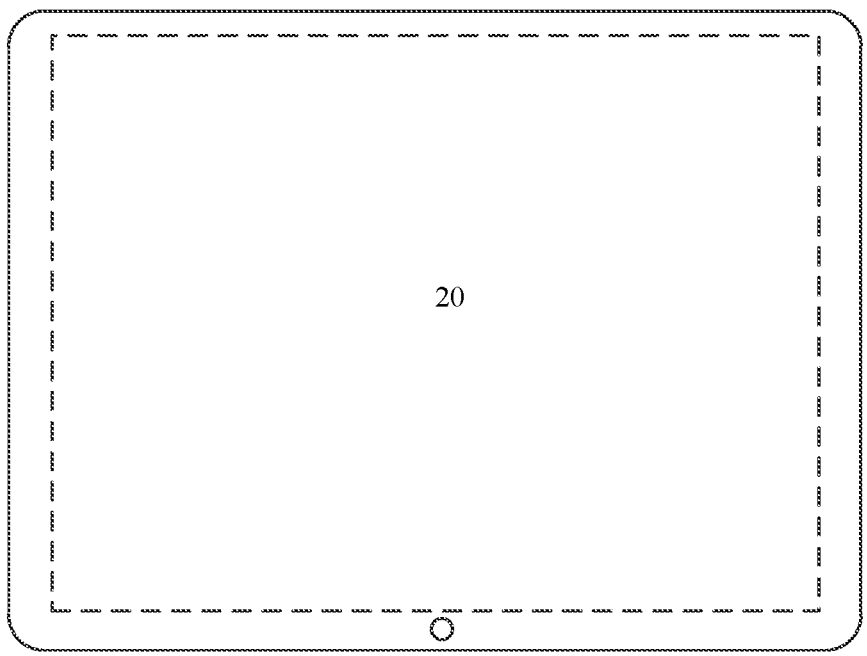
FIG. 6 is a schematic view schematically showing a display device according to an embodiment of the present disclosure.
Figure 7:
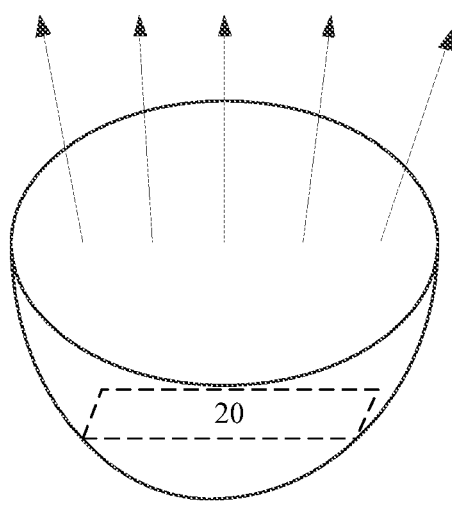
FIG. 7 is a schematic view schematically showing an illuminating device according to an embodiment of the present disclosure.

In addition, in some embodiments, the foregoing backlight module may also be included in various display devices and/or illuminating devices, such as (but not limited to) LCD display devices, flash lamps, lamps, etc., as shown in FIG. 6 and FIG. 7.

The present disclosure has been described in connection with the preferred embodiments. It will be appreciated that various other modifications, substitutions and additions may be made by those skilled in the art without departing from the spirit and scope of the present disclosure. Therefore, the scope of the present disclosure is not limited to the specific embodiments described above, but is defined by the appended claims.

In addition, the functions described herein as being implemented by pure hardware, software, and/or firmware may also be implemented by a combination of dedicated hardware, general-purpose hardware and software, and the like. For example, functions described as being implemented by dedicated hardware (e.g., Field Programmable Gate Array (FPGA), Application Specific Integrated Circuit (ASIC), etc.) may be implemented by a combination of general purpose hardware (e.g., central processing unit (CPU), digital signal processing (DSP) and software, and vice versa.

What is claimed is:

1. A backlight module, comprising:
   a light guide plate having a first surface and a second surface opposed to each other and at least one side surface between the first surface and the second surface, the side surface being provided with a first light reflecting structure and having an acute angle with respect to the first surface;
   a light source disposed at a side of the light guide plate with the first surface, an orthographic projection of the light source onto the first surface being at an edge portion of the first surface of the light guide plate that is adjacent to the side surface; and
   a back plate configured to support the light guide plate and provided with a groove at an edge of the back plate that is close to the side surface,
   wherein the light emitted by the light source is at least partially reflected by the first light reflecting structure after entering the light guide plate through the first surface of the light guide plate, the light source is fixed in the groove, and the back plate has a side wall in contact with the side surface and an extension portion projecting from the side wall toward a side of the back plate facing towards the light guide plate at the edge close to the side surface of the light guide plate, such that the side surface and the side wall and the extension portion of the back plate collectively enclose the light source.

2. The backlight module of claim 1, wherein the first light reflecting structure is a light reflecting film formed on the side surface.

3. The backlight module of claim 1, wherein a portion of the second surface of the light guide plate that adjoins the at least one side surface is provided with a second light reflecting structure, and
   wherein the light emitted by the light source is at least partially reflected by the second light reflecting structure after entering the light guide plate through the first surface of the light guide plate.

4. The backlight module of claim 3, wherein the first light reflecting structure is made from the same material as the second light reflecting structure.

5. The backlight module of claim 3, wherein orthographic projections of both the first light reflecting structure and the second light reflecting structure on the first surface of the light guide plate collectively cover an orthographic projection of the light source on they first surface of the light guide plate.

6. The backlight module of claim 1, wherein the light source is a strip-shaped light source extending along a lengthwise direction of the side surface.

7. The backlight module of claim 1, wherein a portion of the first light reflecting structure separates the side wall of the back plate from the side surface.

8. A display device comprising the backlight module according to claim 1.

9. An illuminating device comprising the backlight module according to claim 1.

10. A method of manufacturing a backlight module, comprising:
    fixing a light source on a back plate;
    forming a first light reflecting structure on at least one side surface of a light guide plate, the at least one side surface of the light guide plate being located between a first surface and a second surface of the light guide plate opposed to each other and having an acute angle with respect to the first surface of the light guide plate; and
    fixing the light guide plate on the back plate, such that the light source is located at a side of the light guide plate with the first surface, and the orthographic projection of the light source on the first surface is at an edge portion of the first surface of the light guide plate that is adjacent to the side surface, and the light emitted from the light source is at least partially reflected by the first light reflecting structure after entering the light guide plate through the first surface of the light guide plate,
    wherein the back plate is provided with a groove at an edge of the back plate that is close to the side surface, and the light source is fixed in the groove; and
    wherein the back plate has a side wall in contact with the side surface and an extension portion projecting from the side wall toward a side of the back plate facing towards the light guide plate at the edge close to the side surface of the light guide plate, such that the side surface and the side wall and the extension portion of the back plate collectively enclose the light source.

11. The method of claim 10, wherein the step of forming the first light reflecting structure on at least one side surface of the light guide plate comprises: forming a light reflecting film on the side surface of the light guide plate.

12. The method of claim 10, further comprising:
    forming a second light reflecting structure on a portion of the second surface of the light guide plate that adjoins the side surface,
    wherein the light emitted by the light source is at least partially reflected by the second light reflecting structure after entering the light guide plate through the first surface of the light guide plate.

13. The method of claim 12, wherein the first light reflecting structure and the second light reflecting structure are formed integrally.

* * * * *